United States Patent [19]

Sato

[11] Patent Number: 4,955,051
[45] Date of Patent: Sep. 4, 1990

[54] DICTATING APPARAUS WHICH IS REMOTELY CONTROLLED UTILIZING A PUSH-BUTTON TELEPHONE

[75] Inventor: Masaaki Sato, Hachioji, Japan

[73] Assignee: Olympus Optical Co., Ltd., Japan

[21] Appl. No.: 99,473

[22] Filed: Sep. 22, 1987

[30] Foreign Application Priority Data

Sep. 24, 1986 [JP] Japan .................. 61-225213

[51] Int. Cl.⁵ .................. H04M 1/65; H04M 11/10; G11B 15/18
[52] U.S. Cl. ........................ 379/75; 369/25; 369/29
[58] Field of Search ............ 360/69; 379/74, 75, 379/77, 97, 70, 76, 67, 88, 105; 369/25-29

[56] References Cited

U.S. PATENT DOCUMENTS

| 3,647,973 | 3/1972 | James et al. | 379/97 |
| 3,725,589 | 4/1973 | Golden | 379/75 |
| 4,309,571 | 1/1982 | Chamberlin | 379/75 |
| 4,488,274 | 12/1984 | Plunkett, Jr. | 369/25 |
| 4,645,875 | 2/1987 | Todd | 379/70 |
| 4,688,117 | 8/1987 | Dwyer et al. | 369/69 |
| 4,788,713 | 11/1988 | Hashimoto | 379/70 |

Primary Examiner—Alan Faber
Assistant Examiner—James E. Tomassini
Attorney, Agent, or Firm—Ostrolenk, Faber, Gerb & Soffen

[57] ABSTRACT

A telephone dictating apparatus comprises DTMF signal converting means which converts DTMF signals given by depressing four push-buttons arranged in one of three longitudinal lines to four mode signals in the same order as the four push-buttons which have one to one correspondence to four mode setting positions associated with a tape running system in a slide switch for switching modes which is employed in a hand microphone for dictation or the like.

12 Claims, 4 Drawing Sheets

DICTATING APPARAUS WHICH IS REMOTELY CONTROLLED UTILIZING A PUSH-BUTTON TELEPHONE

BACKGROUND OF THE INVENTION

The present invention relates to a telephone dictating apparatus, and more particularly, to a telephone dictating apparatus whose operating modes may be changed in response to DTMF (Dual Tone Multi Frequency) signals generated by a push-button telephone.

It is standard practice to record the contents of a letter or report on a magnetic tape using a dictating apparatus and to have a typist or a secretary type the recorded contents using a transcriber (an apparatus used exclusively for reproduction of the recorded type). There are two primary types of dictating apparatus: desk top and portable units. Although protable units can be used everywhere (on the road, in a car, in a hotel and the like), it is necessary to return the magnetic tape to the dictator's secretary before it can be transcribed. This is often inconvenient when prompt handling is required.

To eliminate this inconvenience, a dictation system which allows remote dictation utilizing a push-button (touch-tone) telephone has been devised. Such a system comprises, as shown in FIG. 8, a push-button telephone 101, a telephone exchange 102, a dictating apparatus 103 and a transcriber 104. The push-button telephone is operable to provide DTMF signals to control the various operations (e.g., record (DICT), stopping (STOP), rewinding (REW), reproducing (LISTEN), fast feeding (FF), a cue signal (I) indicating a starting position of instruction and a cue signal (E) indicating a terminal position of a recorded sentance) of the dictation system. Each push-button generates a different dual tone which corresponds to a respective control signal.

To utilize this dictation system, the operator (located in a office or room remote from the dictating apparatus 103) pushes a push-button of the telephone 101 to generate a command signal which causes the dictating apparatus 103 to start. The operator then begins dictating and operates the dictating apparatus 103 by pushing associated push-button of the telephone 101 to cause recording, stopping, rewinding and playback operations of the dictating equipment in a manner similar to a usual dictation. After the dictation is completed and the telephone is hung up, a secretary takes out the dictated magnetic tape cassette from the dicatating apparatus 103 and places the magnetic tape cassette in the transcriber 104 to transcribe the tape cassette.

In the conventional dictation system having the structure discribed above, there is no consistent standard for defining the corresponding relationship between each push-button of the telephone and the various modes of operation of the dictating system 103 (i.e., the generation of cue signals indicting a starting position of instruction and a terminal position of a body of dictation, the recording mode, reverse mode, etc.) and thus the relationship differs depending upon the model of dictating apparatus. For this reason, the operator of the dictating apparatus 103 must memorize (or alternatively must keep a written note) indicating the correspondence between the push-buttons on the telephone and the operating modes of his particular dictating apparatus.

To eliminate this problem, an operation indicating board 202 (on which various operating modes are written in corresponding relationship with respective push-buttons of a telephone 201) may be mounted on an operating area of the telephone 201. In this case, however, the board 202 must be inconveniently carried at all times.

SUMMARY OF THE INVENTION

It is an object of the present invention to provide a telephone dictating apparatus which is easily associated with mode setting positions of a dictating apparatus by placing the positional order of push-buttons of a telephone in corresponding relationship with the order of operating positions of mode setting members of the dictating apparatus.

Specifically, a slide switch 13 employed in a hand microphone 12 of a desk top dictating apparatus 11 shown in FIG. 2 and a slide switch 22 employed in a portable dictating apparatus 21, both of which are operating members for switching modes, are most easily operable as operating means of the dictating apparatus of the present invention. The slide switches 13, 22 are provided so as to be set in the order of, for example, recording (DICT), stopping (STOP), reproducing (LISTN) and rewinding (REW) from top to button such that these switches are operable with the thumb while the hand microphone 12 and the portable dictating apparatus 21 are held with one hand.

By placing the mode setting positions of the slide switches 13, 22 in corresponding relationship with four push-buttons arranged lengthwise in a line of a push-button telephone, it is possible for a dictator to associate his familiar mode setting positions on the push-buttons of the telephone.

According to the present invention, the order of operating push-buttons of a telephone is place in corresponding relationship with that of operating four mode setting positions of the slide switches 13, 22 for setting modes which are provided on a hand microphone for dictation on a dictating apparatus and on a portable dictating apparatus, which are usually in use by a dictator, so that mode setting positions of the dictating apparatus can be easily associated, thus removing the disadvantage described above.

DETAILED DESCRIPTION OF THE PREFERRED EMBODIMENTS

Figure 1:
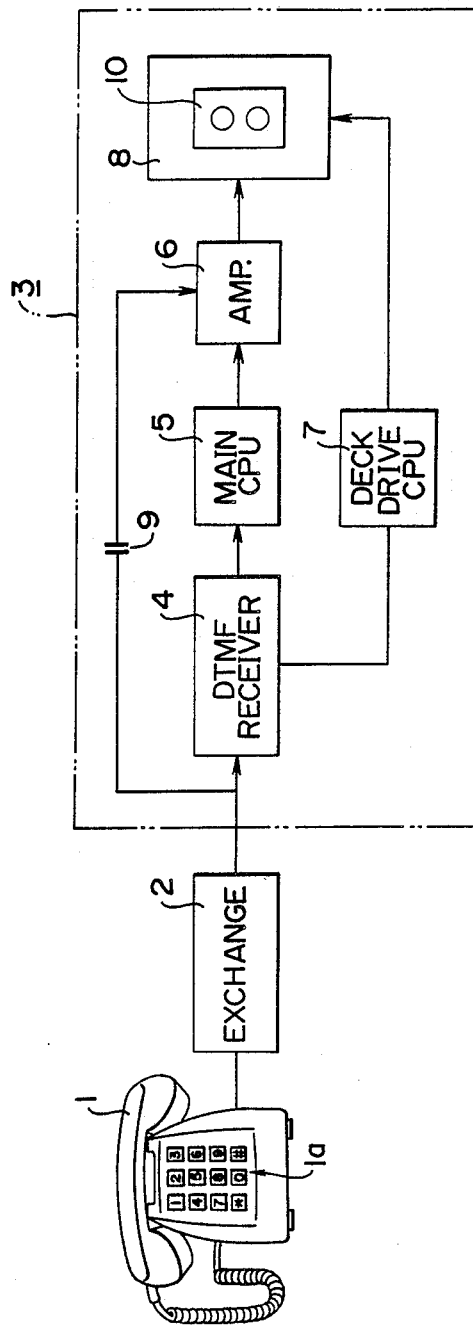
FIG. 1 is a structural schematic diagram showing an embodiment of the present invention.

As shown in FIG. 1, a push-button telephone 1 provided with push-buttons 1a, arranged in three rows of four buttons each, is connected through an exchange 2 to a dictating apparatus 3.

Figure 3:
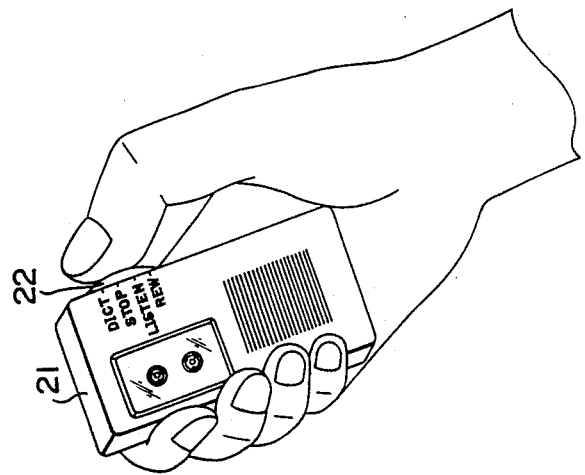
FIG. 3 is a perspective view of a portable dictating apparatus in which mode setting positions are shown in the same manner as in FIG. 2.
Figure 2:
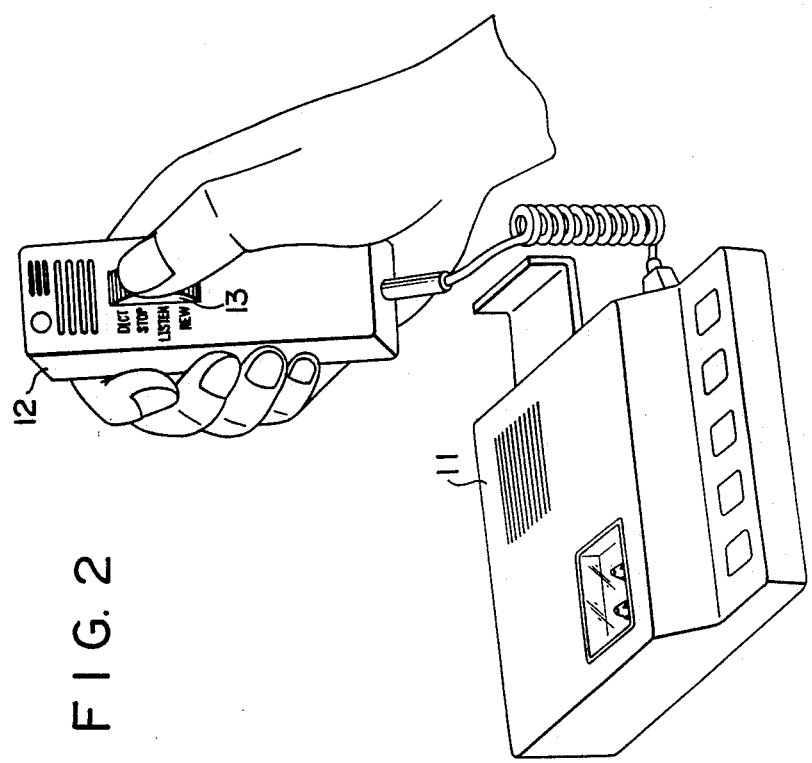
FIG. 2 is a perspective view of a desk top dictating apparatus in which mode setting positions are shown in a hand microphone for dictation.

The dictating apparatus 3 comprises a DTMF receiver 4 (which is a means for converting DTMF signals), a main CPU 5, an amplifier 6, a deck drive CPU 7, a cassette tape recorder deck 8 and a capacitor 9. In this embodiment, DTMF signals generated by depressing one of the push-buttons 1a in the middle row (such buttons being numbered "2", "5", "8" and "0", respectively) are converted by receiver 4 into mode signals in the same order as that of the mode setting positions of the slide switch 13 of the hand microphone 12 shown in FIG. 2 or the slide switch 22 of the portable dictating apparatus 21 shown in FIG. 3. In other words, DTMF signals given by depressing the push-buttons 1a respectively numbered "2", "5", "8" and "0" of the telephone 1, represent mode signals for recording (DICT), stopping (STOP), playback (LISTN) and tape rewinding (REW). These mode signals are delivered to the main CPU 5 to set the cassette tape deck 8 in each of modes of recording, stopping, playback and tape rewinding operations by controlling the amplifier 6 and the deck drive CPU 7 in accordance with the signals from the main CPU 5.

In operation, a dictator calls the dictating apparatus 3 by dialing a given number with the push-buttons 1a of the telephone 1. Then, the dictating apparatus 3 assumes an OFF HOOK state and the connection of a telephone circuit to the dictating apparatus 3 is reported by a beep sound or a composite tone. When an exclusive line for dictation is not used, while an outgoing message is given to a called party with a composite tone, a dictation is made possible by entering a security code with the push-buttons 1a of the telephone 1. Under this state, when the push-button 1a numbered "2" is depressed, a DTMF signal (made up of two signals having different pitches) is delivered via the exchange 2 to the dictating apparatus 3. This DTMF signal "2" is converted by the DTMF receiver 4 to a recording mode signal which is delivered to the main CPU 5. The main CPU 5 then produces command signals which place the amplifier 6 in a recording state and place the deck drive CPU 7 in a recording state to keep the deck 8 in a recording state. Subsequently, when the operator starts dictating, a dictating signal is amplified through the capacitor 9 (which acts as a filter for cutting off a DC component) by the amplifier 6 to be recorded on the cassette tape 10. When the operator wants to pause in his dictation, he depresses the push-button numbered "5". He resumes recording by depressing the push-button numbered "2". In addition, when the operator wants to listen to part of his dictation, he depresses the push-button numbered "0" to rewind the tape and then depresses the push-button numbered "8" to playback his dictation. The apparatus 3 may be designed to operate in a backspace mode which rewinds the tape only while the push-button 1a numbered "0" is depressed or to operate in a mode wherein the tape cassette 10 is rewound until the push-button for the next mode, that is, the push-button numbered "8" is depressed. DTMF signals generated in response to the depression of the push-buttons numbered "5", "8" and "0" are able to respectively command stop, playback and rewinding operations in a manner similar to the push-button numbered "2". The recording, stopping, playback and rewinding modes each can be selected at random by depressing the respective push-buttons numbered "2", "5", "8" and "0".

When the dictation is completed, the push-button numbered "5" is depressed to stop the deck 8 and then the telephone is hung up.

In the subsequent dictation, when the dictating apparatus 3 is called, a new dictation can be recorded on the cassette tape 10 on the deck 8 in a manner similar to the foregoing.

Consequently, according to the above-mentioned structure, the push-buttons 1a numbered "2", "5", "8" which are arranged, for example, in the central row of the telephone 1, is placed in corresponding relationship with the positions in the mode setting order (which are familiar to a dictator) of the slide switch 13 in the hand microphone 12 of the desk top dictating apparatus 11 or the slide switch 22 in the portable dictating apparatus 21, so that modes of the dictating apparatus can be easily and conveniently associable with the arrangement of the push-buttons numbered "2", "5" "8" and "0" of the pushbutton series 1a of the telephone 1 without memorizing the operating positions of the push-button series 1a or seeing a note on them.

Figure 4:
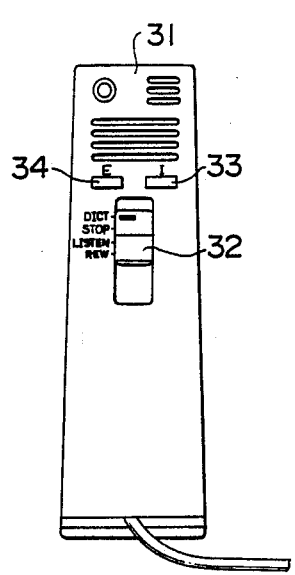
FIG. 4 is a front view of a hand microphone for dictation in which another example of model setting positions is shown.
Figure 5:
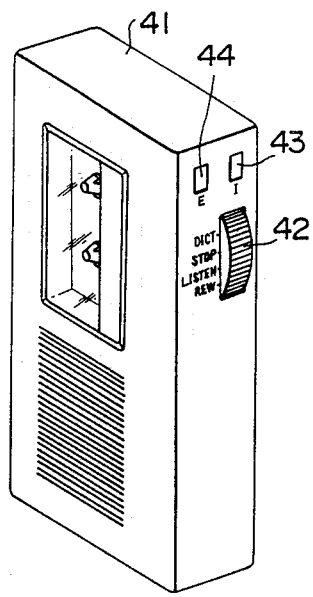
FIG. 5 is a perspective view of a portable dictating apparatus in which a further example of mode setting positions is shown.
Figure 6:
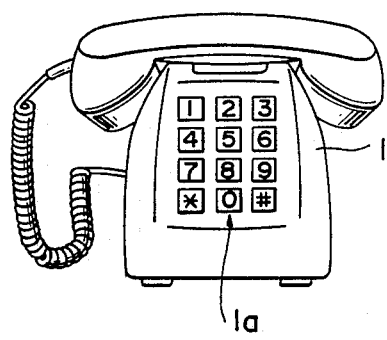
FIGS. 6 and 7 are front views respectively showing positional arrangements of push-buttons in a push-button telephone.

In the above-described embodiment, although a mode associated with the tape running system is made selectable with the center row of push-buttons of the telephone 1, it may be modified to be selectable with the arrangement of four push-buttons in the right-hand or left-hand rows. In addition, as in a hand microphone 31 of the desk top dictating apparatus shown in FIG. 4 or a portable dictating apparatus 41 shown in FIG. 5, (I) mark recording buttons 33, 43 which generate an (I) mark cue signal indicating a starting position of an instruction, and (E) mark recording buttons 34, 44 which generate an (E) mark cue signal indicating a terminal position of a body of dictation can be arranged on opposite sides of slide switches 32, 42 which select a mode associated with the tape running system. Similarly, with a structure, as shown in FIG. 6, in accordance with the above layout, it is also possible to produce (I) and (E) mark signals with push-buttons numbered "1" and "3" of a series of push-buttons 1a of a telephone 1.

In this case, a DTMF signal given by depressing the push-button numbered "1" is converted by the DTMF receiver 4 to a cue signal (E) for recording an (E) mark. When the cue signal (E) is delivered to the main CPU 5, the main CPU 5 delivers a command to the deck drive CPU 7 so as to keep it in a recording state for a given time period and the deck 8 is controlled by the deck drive CPU 7 to assume a recording state. On the other hand, the amplifier 6 received a command of delivering an (E) mark signal from the main CPU 5 delivers an (E) mark signal to a head only for a given time period to record the (E) mark on a tape. Similarly, and (I) mark can be recorded by depressing the push-button number "3". When the (E) and (I) marks are scanned by the dictating apparatus, their positions can be indicated and when searched, they can be stopped at their positions.

Figure 7:
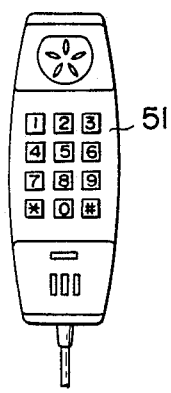
Figure 8:
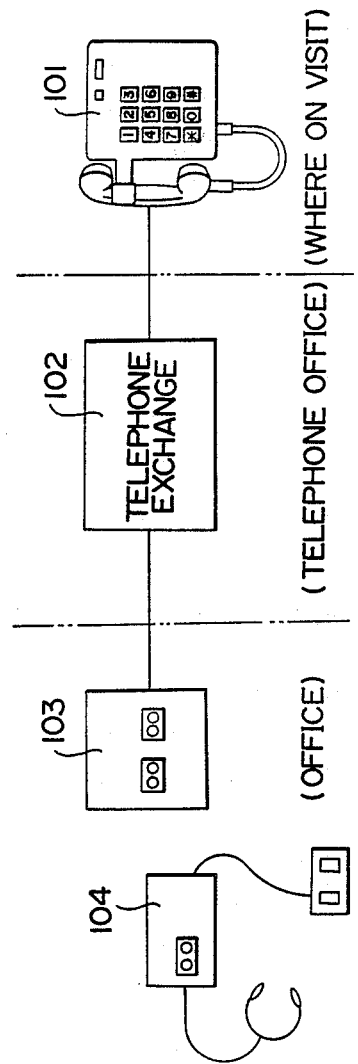
FIG. 8 is a diagram showing a structure of a dictation system utilizing a push-button telephone.
Figure 9:
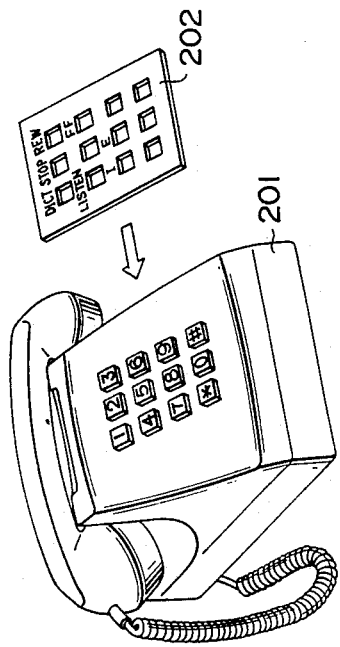
FIG. 9 is a perspective view showing an operation indicating board suggested in the past.

With the above structure, it is possible to place the push-buttons numbered "2", "5", "8" and "0" in the central column and the push-buttons numbered "1" and "3" at the top of push-buttons in the left and right columns in corresponding relationship with positions for setting various operating models for the hand microphone 31 and the portable dictating apparatus 41, so that all mode setting positions which are familiar to a dictator are associable on the dialing push-buttons. Particularly, when a telephone 51 of the hand type as shown in FIG. 7 is employed, various mode setting positions are easily associable on push-buttons arranged in a manner similar to the hand microphone 31 in image.

While the push-buttons 1a which produce the (E) and (I) mark signals are designated as the positions numbered "1" and "3" at the top of the left and right hand columns of push-buttons in the above embodiment, it is to be noted that they may be located at other positions in opposing relationship in such columns.

In addition, to prevent the following disadvantage, a push-button may be depressed twice. If the dictator makes a sound which is the same as one of the DTMF signals, the dictating apparatus may change modes without a push-button telephone having been operated.

To avoid this problem, the system can require that two push-buttons be depressed to activate a mode change. For example, as in the following button operations in recording, it may be achieved to prevent the disadvantage by depressing the button twice.

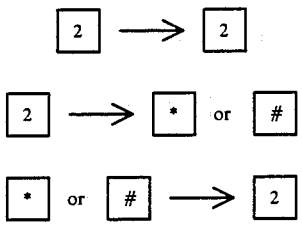

① ② ③

What is claimed is:

1. A telephone dictating apparatus operable in record, playback, stop and rewind modes, said apparatus comprising:
   a hand held control device having a control switch movable into record, playback, stop and rewind positions having a predetermined spatial relationship;
   control means for switching said dictating apparatus between said modes as a function of the position of said control switch; and
   telephone signal receiving means responsive to four DTMF signals generated by a telephone and transmitted to said dictating apparatus over telephone lines, said telephone having a plurality of push-buttons arranged in a spatial relationship, said telephone generating respective DTMF signals in response to the depression of respective ones of said push-buttons, said four DTMF signals being generated in response to the depression of four respective ones of said push-button of said telephone, said four respective push-buttons having a spatial relationship with respect to one another which is substantially the same as the spatial relationship of the record, playback, stop and rewind positions of said control switch; said telephone signal receiving means causing said control means to switch said dictating apparatus between said record, playback, stop and rewind modes in response to the receipt of a respective one of said four DTMF signals generated by the depression of the one of said push buttons in a spatial position corresponding to the spatial position of the control switch of the hand held control device which activates the desired mode, such that there is a one-to-one spatial correspondence between the functions of said four respective push buttons of said telephone and the functions of said four respective positions of said control switch of said hand held control device.

2. A telephone dictating apparatus according to claim 1 in which the dictating apparatus comprises a DTMF receiver which is the telephone signal receiving means, a main CPU, an amplifier, a tape deck drive CPU, a cassette tape recorder deck and a capacitor for cutting off a DC component.

3. A telephone dictating apparatus according to claim 1 in which said telephone signal recieving means generates said respective mode signals in response to the receipt of at least two respective ones of said DTMF signals within a given time period.

4. A telephone dictating apparatus according to claim 3 in which said telephone signal receiving means generates a respective mode signal for causing said control means to switch said dictating apparatus between said record, playback, stop and rewind modes in response to the receipt of two or more of the same of said DTMF signals within said given time period.

5. A telephone dictating apparatus according to claim 3 in which said telephone signal receiving means generates a respective mode signal for causing said control means to switch said dictating apparatus between said record, playback, stop and rewind modes in response to the receipt of two or more different ones of said DTMF signals within a given time period.

6. A telephone dictating apparatus according to claim 1 in which said telephone is of the type which has three vertical columns of four push-buttons each and wherein said four push-buttons which generate said four DTMF signals are located in a single vertical column.

7. A telephone dictating apparatus according to claim 6 in which said single vertical column is the middle column of said three vertical colums of four push-buttons.

8. A telephone dictating apparatus according to claim 1 in which upper most, upper second, upper third and lower most buttons of the four push-buttons correspond to record, stop, playback and rewind modes, respectively.

9. A telephone dictating apparatus according to claim 8 in which push-buttons bearing the numbers 2, 5, 8 and 0 correspond to record, stop, playback, and rewind modes, respectively.

10. A telephone dictating apparatus according to claim 7 in which said telephone signal receiving means is responsive to two additional DTMF signals generated by a telephone in response to the depression of two additional respective push-buttons on opposite sides of said middle vertical column, said telephone signal receiving means causing said control means to generate a first cue mark in response to the receipt of a first of said two additional DTMF signals and to generate a second cue mark in response to a second of said two additional DTMF signals.

11. A telephone dictating apparatus according to claim 10 in which said two additional respective push-buttons are identified by the symbols * and #, respectively, on the telephone.

12. A telephone dictating apparatus according to claim 10 in which said first and second cue an E mark corresponding to a body of dictation, respectively.

* * * * *